United States Patent [19]

Nissen

[11] Patent Number: 5,087,472

[45] Date of Patent: * Feb. 11, 1992

[54] FEED COMPOSITIONS FOR DOMESTICS ANIMALS CONTAINING HYDROXYMETHYLBUTYRATE

[75] Inventor: Steven L. Nissen, Ames, Iowa

[73] Assignee: Iowa State University Research Foundation, Inc., Ames, Iowa

[ * ] Notice: The portion of the term of this patent subsequent to Feb. 12, 2008 has been disclaimed.

[21] Appl. No.: 656,296

[22] Filed: Feb. 15, 1991

Related U.S. Application Data

[63] Continuation-in-part of Ser. No. 472,090, Jan. 30, 1990, Pat. No. 5,028,440.

[51] Int. Cl.$^5$ .............................................. A23K 1/00
[52] U.S. Cl. ...................................... 426/623; 426/2; 426/630; 426/636; 426/807; 514/557
[58] Field of Search .................... 426/635, 807, 2, 623, 426/630, 656, 636; 514/557

[56] References Cited

U.S. PATENT DOCUMENTS

| | | | |
|---|---|---|---|
| 2,878,124 | 3/1959 | Kruckenberg | 514/557 |
| 4,073,960 | 2/1978 | Scott et al. | 426/807 |
| 4,376,790 | 3/1983 | Ames | 426/2 |
| 4,388,327 | 6/1983 | Cummins | 426/807 |
| 4,673,576 | 6/1987 | D'Aiello | 426/2 |
| 4,758,593 | 7/1988 | Nissen | 514/557 |
| 4,760,090 | 7/1988 | Nissen | 514/557 |
| 4,764,531 | 8/1988 | Nissen | 514/557 |
| 4,835,185 | 5/1989 | Nissen | 514/557 |
| 4,883,817 | 11/1989 | Nissen | 514/557 |
| 4,992,470 | 2/1991 | Nissen | 514/578 |

OTHER PUBLICATIONS

Krebs et al., Adv. Enz. Reg., Aspects of the Regulation of the Metabolism of Branched-Chain Amino Acids, 15:375-394 (1976).
Paston et al., J. Biol. Chem., Isolation of Rabbitt Liver Branched Chain α-Ketoacid Dehydrogenase and Regulation by Phosphorylation, 257:14433-14439.
Landaas, Clin. Chem. Acta, Accumulation of 3-Hydroxyisobutyric Acid 2-Methyl-3-Hydroxybutyric Acid and 3-Hydroxyisovaleric Acid in Ketoacidosis, 64:143-154 (1975).
Sabourin et al., Fed. Proc., Branched-Chain α-Keto Acid Decarboxylases in Rat Liver, 38:283 (1979).
Sabourin et al., Arch. Biochem. Biophys., Subcellular Distribution and Partial Characterization of an α-Ketoisocaproate Oxidase of Rat Liver: Formation of β-Hydroxyisolvaric Acid, 206:132-144 (1981).
Tanaka et al., Proc. Natl. Acad. Sci., Isovaleric Acidemia: A New Genetic Defect of Leucine Metabolism, 56:236-242 (1966).
Tanaka et al., Biochim. Biophys. Acta, Identification of β-Hydroxyisovaleric Acid in the Urine of a Patient with Isovaleric Acidemia, 152:638-641 (1968).
Chawla et al., J. Nutri. Efficiency of α-Ketoisocaproic Acid as a Substitute for Leucine in the Diet of the Growing Rat, 105:798-803 (1975).
Boebel et al., J. Nutr., Comparative Utilization of the α-Keto and D- and L-α-Hydroxy Analogs of Leucine, Isoleucine and Valine by Chicks and Rats, 112:1929-1939 (1982).
Chow et al., J. Nutr., Substitution of Five Essential Amino Acids by their Alpha-Keto Analogues in the Diet of Rats, 104:1208-1214 (1974).
Kuhlman et al., FASEB Abstract, The Effects of Leucine and Leucine Metabolites on in vitro Lymphocyte Blastogenesis, Abstract 236, (1989).

*Primary Examiner*—R. B. Penland
*Attorney, Agent, or Firm*—Tilton, Fallon Lungmus & Chestnut

[57] ABSTRACT

Feed compositions are provided for raising meat-producing ruminants and polutry. β-hydroxcy-β-methylbutyric acid or an edible salt thereof (HMB) is incorporated in the ruminant or poultry feeds to obtain a substantial increase in meat and/or to improve the quality of the lean meat.

2 Claims, No Drawings

FEED COMPOSITIONS FOR DOMESTICS ANIMALS CONTAINING HYDROXYMETHYLBUTYRATE

RELATED APPLICATION

This application is a continuation-in-part of copending application Ser. No. 07/472,090, filed Jan. 30, 1990 U.S. Pat. No. 5,028,440.

BACKGROUND OF INVENTION

The keto analog of L-leucine (a dietarily essential amino acid) is o-keto-isocaproic acid, which is usually referred to as ketoisocaproate (KIC), or sometimes also as ketoleucine. In the accepted description of leucine metabolism, leucine is first transaminated to its ketoacid, α-ketoisocaproate (KIC). KIC then enters the mitochondria and is decarboxylated to isovalarylCoA by the branched chain ketoacid dehydrogenase. [See Krebs, et al., *Adv. Enz. Reg.* 15:375–394 (1976); and Paxton, et al., *J. Biol. Chem.* 257:14433—14439 (1982).] An alternate minor pathway has been described in the rat and human liver [Sabourn, et al., *Fed. Proc.* 38:283 (1979)]. This alternate oxidative pathway occurs in the cytosol and involves oxidation of KIC to β-hydroxy-β-methyl butyrate (HMB) by the enzyme KIC-oxygenase [Sabourn, et al., *Arch. Biochem. Biophys.* 206:132-144 (1981)].

The administration of keto analogs of amino acids has been proposed for treatment of certain disease conditions in humans, such as uremia. [See, for example, Walser, et al., J. Clin. Inv., 52:678–690 (1973).] For nutritional purposes, it is known that KIC is an inefficient substitute for leucine. Rat studies have shown that the feeding of KIC as a replacement for leucine requires the feeding of from two to three times as much KIC as the nutritionally required amount of leucine: Chawla, et al., *J Nutr.*, 105:798–803 (1975); and Boebel, et al., *J. Nutr.*, 112:1929-1939 (1982); and Chow, et al., J. Nutr., 104: 1208-1214 (1974).

It has been proposed to feed small amounts of KIC in conjunction with animal diets containing sufficient leucine for the purpose of improving the growth metabolism of the animals. By using milligram amounts of KIC, some increases in the rates of weight gain and/or feed efficiencies have been obtained. [See, for example, U.S. Pat. Nos. 4,760,090 and 4,883,817.] With mature sheep being fed for wool production, by feeding KIC the amount of wool produced may also be increased (U.S. Pat. No. 4,760,090). When lactating domestic animals, such as dairy cattle, are fed small amounts of KIC, the quantity of milk produced may be increased (U.S. Pat. No. 4,758,593). Egg production by laying chickens can also sometimes be increased (U.S. Pat. No. 4,760,531). Other effects of feeding KIC have been observed, including cholesterol reduction in meat, milk and eggs (U.S. Pat. Nos. 4,760,090 and 4,760,531), and some apparently beneficial effects on the immune system (U.S. Pat. No. 4,835,185).

Why KIC addition to protein and leucine sufficient animal diets can have different effects than the metabolic conversion of leucine to KIC is not known. The beneficial effects of KIC on domestic animals are not consistently obtainable. Variability of benefits have been particularly observed in the KIC feeding of ruminants. KIC supplementation has not become an established animal feeding practice for any purpose. With reference to the use of KIC in feeds for cattle and sheep, a major problem is that the KIC is subject to partial rumen destruction, which is a variable factor. The use of rumen-protective agents and procedures for KIC has not been shown to be satisfactory for commercial purposes.

Nutritionally, as described above, leucine is converted to KIC, which in the mitochondria is decarboxylated to isovalarylCoA. In certain disease conditions, such as isovalaric acidemia, an alternate oxidative pathway for KIC has been observed in the liver, which may produce the substance β-hydroxy- β-methylbutyrate (HMB). To date, however, there is little or no evidence that HMB is normally produced in the metabolism of KIC. In some extreme cases, such as genetic absence of the dehydrogenase enzyme, there is evidence HMB accumulates in the urine: Tanaka, et al., *Proc. Natl. Acad. Sci.,* 56:236–242 (1966); and Tanaka, et al., *Biochim. Biophys. Acta.* 152:638–641 (1968). In acidosis conditions HMB levels may be increased in urine: Landass, *Clin. Chim. Acta,* 64:143-154 (1975).

Animals can be stimulated to grow in a general way which increases all organs and tissues. In that case, overall weight gain is usually increased, and feed efficiency can also be increased, although usually not as much as the rate of gain. Muscle or lean tissue can be stimulated to grow at the expense of fat or other organs. In that case, weight gain rate may not change, but usually feed efficiency is improved. Thus, growth of lean tissue can be markedly stimulated without a major change in average daily gain, or other measure based on body weight. The meat industry is now moving toward paying producers on the basis of lean tissue weight rather than on total animal weight. Thus, it is becoming important to base performance on lean tissue gain and lean tissue feed efficiency. However, previous research with KIC had not shown that it specifically stimulates lean tissue gain (e.g., muscle growth). In some cases KIC has been shown to decrease fat deposition, such as in sheep, but KIC generally has not been found to stimulate muscle growth.

SUMMARY OF INVENTION

β-hydroxy-β-methyl butyrate (HMB) has been found to be more effective for improving growth metabolism of domestic animals than α-ketoisocaproate (KIC). A major effect of HMB is to increase markedly the development of lean tissue. This desirable effect is not obtainable with KIC although there is a slight tending for KIC to reduce the accumulation of body fat.

With reference to ruminants, HMB has the advantage of not being subject to appreciable rumen destruction. Consequently, HMB can be administered orally in defined amounts to ruminants, such as an additive to feeds for cattle or sheep, to obtain the growth metabolism effects and especially to increase the amount of lean tissues produced. Advantageous growth metabolic effects can also be obtained by the feeding of HMB to non-ruminants, including poultry being raised for meat production.

Increase in lean tissue by HMB feeding is typically accompanied by a decrease in the amount of fat contained in separate fatty layers, as distinguished from marbling fat distributed in lean tissue. With respect to beef cattle and sheep, feeding requirements take into consideration the distribution of fat (marbling) in the lean tissue, for example, by rib-eye examination. The feed compositions of this invention do not result in downgrading of carcasses because of reduced marbling, but instead provides as good or better fat distribution within the lean tissues. Juicy, flavorful lean meat can thereby be produced.

The desired growth effects described above can be obtained by the oral administration of calcium-HMB (Ca—HMB) or equivalent molar amount of other water-soluble non-toxic HMB salt. Amounts as low as 15 to 35 milligrams (mg) per kilogram (kg) of body weight per 24 hours can be used.

DETAILED DESCRIPTION

The compound used for practicing the present invention is β-hydroxy-β-methyl butyric acid or an edible butyrate salt thereof. The free acid compound is also called β-hydroxy-isovalaryic acid. It has the following structure:

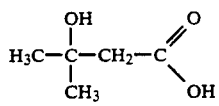

This compound in both free acid and salt form is referred to herein generically as "HMB". The acid form is designated HMB acid, and the specific salt form, such as the calcium or sodium salts, as Ca—HMB or Na—HMB. HMB has no isomers and accordingly does not exist in L or D forms. For the purpose of the present invention, it is preferred to employ HMB in the form of an edible salt rather than as the free acid. Preferably the salt form is water-soluble or becomes water-soluble in the stomach or intestines of the domestic animal. A preferred salt is the calcium salt (Ca—HMB). Sodium (Na—HMB) can also be used but Na—HMB is more hydroscopic than Ca—HMB. Other non-toxic salts can be used such as other alkali metal or alkaline earth metal salts. For mixing with feed ingredients, it is preferred that the salt form be dry, non-sticky, and finely-divided for blending with the feed materials. Ca—HMB is particularly desirable for these reasons.

HMB is not known to be commercially available. However, procedures are known for synthesizing this compound from commercially available starting materials. For example, HMB can be synthesized by oxidation of diacetone alcohol (4-hydroxy-4-methyl-2-pentanone). One suitable procedure is described by Coffman, et al., *J. Am. Chem. Soc.*, 80:2882-2887, at 2885 (1958). As there described, β-hydroxy-isovalaryic acid (HMB) is synthesized by an alkaline sodium hypochlorite oxidation of diacetone alcohol. The product is recovered in free acid form, which can be converted to the desired salt. For example, HMB can be prepared as its calcium salt (Ca—HMB) by a similar procedure to that of Coffman, et al. in which the HMB acid obtained is neutralized with calcium hydroxide, and recovered by crystallization from an aqueous ethanol solution. For example, a 95% ethanol solution can be used with the Ca—HMB at about a 10% concentration. Such a procedure is illustrated in more detail in the following examples.

To assure administration at a desired level, it is preferred to mix the dry HMB salt with the dry feed ingredients to a predetermined concentration. The HMB salt can be incorporated by dry blending using standard mixing equipment. The HMB should be substantially uniformly distributed throughout the feed. After mixing, if desired, the feed material may be further processed, such as by conversion to pellets.

Most feed compositions for domestic animals, such as for the raising of ruminants or poultry, are composed of mixtures of feed ingredients. These feed compositions contain protein-providing ingredients as principal components. These feed ingredients usually provide at least 10% protein by weight on a total dry matter basis, and may contain as much as 24% or more by weight. Such mixed feed compositions may comprise complete feeds or feed concentrates.

When HMB is combined with the feed material as a uniform mixture, and the feed composition provides the major food source for the diet, the amount of HMB may be specified in relation to the feed composition. For example, the admixed total ration feed compositions may contain from 0.001 to 0.5 wt % HMB (Ca—HMB and dry feed basis). On the same basis, a presently preferred range is from about 0.01 to 0.1 wt. % HMB. Such complete feed compositions will usually contain at least 10% protein and may contain up to 24% protein ($N \times 6.25$). For example, beneficial growth effects such as enhanced lean tissue development can be obtained in preferred embodiments by incorporating from about 0.02 to 0.04 wt. % (dry basis) of Ca—HMB or molar equivalent amount of another edible non-toxic water-soluble salt of HMB.

The foregoing feed composition levels of HMB relate primarily to feeds which are formulated to comprise substantially the total ration of the animal. Where feed supplements or feed concentrates are employed as the vehicle for administering the HMB, greater concentrations may be required. The concentrations can be similarly related to either the total diet of the animal, or to the body weight of the animals being fed.

It is believed that some beneficial effects can be obtained with as little as 0.05 to 0.2 milligrams (mg) of HMB (Ca—HMB basis) per kilogram (kg) body weight per 24 hours. It will usually be desirable, however, to administer at least 0.5 mg/kg body weight/24 hrs (Ca—HMB basis). It will not usually be necessary to administer more than 100 mg HMB (Ca—HMB basis) per kilogram of body weight per 24 hours, but higher amounts can be given up to 400 to 500 milligrams HMB on the stated basis. An optimum range for most domestic animals is believed to be from about 15 to 35 mg/kg body weight/24 hrs (Ca—HMB basis).

As previously indicated, it is preferred to combine HMB with a complete feed ration, feed concentrate, or other dry feed material being given to the cattle, sheep, chickens, turkeys, or other domestic animal responsive to HMB. In certain cases, however, HMB could be administered by dissolving it in drinking water for the animals. However, control of the amount administered in water can be expected to be more difficult. For more precise control, HMB could be orally administered in the form of pellets. For example, such pellets could be spread as a top dressing on the daily (24 hr) feed ration for each animal. Other methods of administration could be used.

As far as is known, HMB is not subject to significant rumen destruction. Following oral administration, the HMB salt appears to pass intact through the rumen into the intestines of the ruminant where it is absorbed. For the purpose of the present invention, it is believed that HMB should be absorbed into and distributed in the circulatory system.

In improving growth metabolism of domestic animals, several different effects can be selected as a primary purpose of the HMB administration. For example, with respect to animals being raised for meat production, including beef cattle, such as steers and heifers, as well as lambs, and chicks, a principal objective can be to increase the development of lean tissue while minimizing the accumulation of body fat. Another objective is to improve the quality of meat by better fat distribution (marbling) in the lean meat as distinguished for separate accumulations of fat. Juicier and more flavorful meat can thereby be produced.

The method of this invention and the feed compositions for use therein can be further illustrated by the following experimental examples.

EXAMPLE 1

PREPARATION OF Ca—HMB

Reaction is contained in a 5000 ml round bottom flask fitted with condenser. Constant mixing is achieved by a magnetic stirrer.

Add in sequence:
1 gallon bleach (5.25% Sodium Hypochlorite)
45 g NaOH powder
Mix well.
150 ml 1,4 Dioxane
93 ml 4-Hydroxy-4-Methyl-2-Pentanone.
Reflux for 40 minutes.
Transfer solution to washtub and cool for 30 minutes under a hood.
pH to 5 using concentrated $H_2SO_4$. (HMB is stabilized.)
Transfer solution to cooling pans under a vent hood, so that air is drawn in over the solution for faster evaporation. Use the steam table if possible.
Let solution evaporate overnight. Sodium sulfate salts will precipitate out forming a slurry.
Transfer slurry to washtub, and adjust pH to 1 using concentrated $H_2SO_4$.
Salts and solution may be extracted separately depending on the volume available after evaporation.
Transfer solution with/without salts to 10 liter bottle, and wash 4× with approximately 2 liters of Ethyl Acetate. (Acetate layer contains HMB.)
Save ethyl acetate layer. Discard final acid layer.
Roto Vap Acetate layer at 50° C.
Salts may precipitate out.
Solubilize in Ultra-pure $H_2O$.
Add an equal volume of Ethyl Acetate and re-extract. Save ethyl acetate layer.
Roto Vap Acetate layer at 50° C.
Increase Temperature to 70° C. and continue Roto Vap. Remaining solution contains HMB and is ready for crystallization.

The dried HMB acid is neutralized with calcium hydroxide powder. The powder is added to the stirring HMB acid until a basic pH is reached. The pH is assessed with pH paper. The HMB solidifies at this point and is subsequently dissolved in hot 95% ethanol at a volume of 10 times the original acid volume. Material that does not dissolve is removed from the liquid by centrifugation or filtration. The ethanol-HMB solution is then placed at −20% F until the mixture crystallizes. Usually this takes overnight but can take 2-3 days. The HMB crystals are then filtered under vacuum through paper towels and liquid squeezed out of the cake-like crystals. The HMB crystals are then redissolved in hot ethanol and the process repeated. In most cases 3 recrystallizations are sufficient to fully remove any yellow color from the crystals. Further purification can be achieved by further crystallization. After the final crystallization the HMB is placed in a pan and freeze-dried overnight to obtain an anhydrous calcium HMB powder ready for feed additive use.

EXAMPLE 2

STABILITY OF HMB IN THE RUMEN

Rumen fluid was collected from a fistulated steer. After filtration and dilution (1:4) with an artificial saliva, 25 ml of the solution was added to 50 ml plastic tubes. Each tube was fitted with a one-way valve to allow gases to escape while not allowing air into the tube. Each tube was then gassed with $CO_2$ and incubated at 39° C. After 30 min a solution of KIC or HMB was added to the tube in concentrations to simulate what would be present in the rumen of an animal consuming 0.05% of the diet as KIC or HMB. It was estimated that a 50 μM concentration would be attained in this case. At timed intervals 50μl samples of this rumen fluid were taken and analyzed for KIC and HMB. The results are shown in Table A.

TABLE A

| Time after Addition (min) | KIC | HMB |
|---|---|---|
| 0 | 30* | 60 |
| 15 | 15 | 76 |
| 30 | 4 | 81 |
| 60 | 2 | 71 |
| 240 | 2 | 74 |
| 480 | 1 | 74 |

*Initial concentration of KIC could only be estimated. The initial concentrations should have been −50 uM but because of the rapid degradation of KIC in the rumen, KIC was already being degraded before the 0 time collection could be cooled and processed.

The foregoing shows that KIC is rapidly destroyed by the rumen bacteria while HMB is quite stable in a rumen environment.

EXAMPLE 3

FEEDING OF HMB TO LAMBS—TRIAL 1

Material and Methods

Animals and Experimental Design. Three sets of twin lambs were housed individually in fiberglass pens. Animals were randomly assigned to control or HMB diets, using Ca—HMB as the feed additive at a level of 0.5% of the basal diet.

TABLE B

| Composition of Basal Diet Fed to All Sheep. | |
|---|---|
| Ingredient | Kg Dry Matter Experiment 1 |
| Ground corn | 84.4 |
| Expeller soybean meal | 5.1 |
| Molasses | 6.5 |
| Trace mineral & vitamin premix | 0.66 |
| Salt | 0.66 |
| Limestone | 2.1 |
| Urea | 0.66 |

The results are summarized below in Table C.

TABLE C

| | Renal Fat % (% of animal live weight) | Back Fat (in) (fat thickness over 12th rib) | Longissimus area (sq. in.) |
|---|---|---|---|
| Controls: | 2.42 | .21 | 2.1 |
| HMB: | 1.90 | .12 | 2.3 |
| % change due to HMB | −22%* | −43%* | +10% |

TABLE C-continued

| Feed/Gain | Average daily gain (kg/day) | |
|---|---|---|
| Controls: | .287 | 3.89 |
| HMB: | .296 | 3.60 |
| % change due to HMB | +3% | −7% |

*$P < 0.5$

As shown by the foregoing data, in this limited study HMB appeared to stimulate growth of lean tissues at the expense of fat. Both measures of fat decreased dramatically while the muscle weight increased substantially from controls.

EXAMPLE 4

FEEDING OF HMB TO LAMBS—TRIAL 2

Animals and Experimental Design. Twenty-two lambs were housed individually in fiberglass pens (1.15 m$^2$) and randomly assigned to control or HMB diets. The control had nothing added to the diet while the HMB animals had 1 g of CaHMB supplemented to their diets each day. At the beginning of the experiment animals were weighed and ultrasound measurements made of the longissimus area and the amount of fat over the longissimus muscle. These measurements were made over the 12th rib area. Feed consumption was monitored. At the end of the experiment animals were weighed, feed consumption measured and the longissimus area and fat thickness measured again with the ultrasound apparatus. The gain in longissimus area and backfat were calculated from the initial value. This noninvasive method of estimating muscle and fat deposition has been shown to be a reliable method of assessing these values without slaughtering the animal.

TABLE D

Composition of Basal Diet Fed to All Sheep

| Ingredient | Kg Dry Matter | |
|---|---|---|
| | Without HMB | With HMB |
| Ground corn | 48.2 | 48.2 |
| Dehydrated alfalfa | 20.0 | 20.0 |
| Expeller soybean meal | 25.0 | 25.0 |
| Molasses | 5.0 | 5.0 |
| Trace mineral & vitamin premix | 0.2 | 0.2 |
| Salt | 0.5 | 0.5 |
| Limestone | 0.93 | 0.88 |
| Ammonium chloride | 0.30 | 0.30 |
| Ca-HMB | 0 | 0.050 |

Results:

TABLE E

The Effects of Feeding HMB to Young Lambs from 60 lbs. to 100 lbs.

| | Control | HMB | % Change |
|---|---|---|---|
| Total gain (lbs) | 38.5 | 40.5 | +6% |
| Feed/gain | 4.41 | 4.28 | −6% |
| Loin area gain (cm2) | 2.08 | 3.34 | 60%** |
| Back fat gain (cm) | .27 | .19 | −30%** |

**$P < .02$ level

The foregoing data indicates that HMB supplementation increases performance and increases lean vs. fat gain. These results are therefore corroborative of those of the first trial.

EXAMPLE 5

FEEDING HMB TO POULTRY

To compare KIC and HMB as growth promotants, young male leghorn chicks were allotted to 12 battery (wire mess floors) pens consisting of 10 birds each. Treatments of control, HMB (0.04% of the diet) and KIC (0.04% of the diet) were assigned to the pens Feed consumption was measured during the 5 week experiment. During week 2 of the experiment chicks were injected with 50 μl of a 20% suspension of pig red blood cells intraperitoneally.

Chicks were fed a diet adequate in all nutrients for leghorns of this age. HMB was a supplement to this diet at 0.04% of the diet (w/w). The following diet was used as shown in Table F.

TABLE F

| Ingredients (KG Each) | Control Diet | HMB Diet |
|---|---|---|
| Ground corn | 59.3 | 59.3 |
| Soybean meal | 19.7 | 19.7 |
| Wheat Middlings | 13.4 | 13.4 |
| Fish Meal | 3.0 | 3.0 |
| Calcium Carbonate | 0.71 | 0.66 |
| Dicalcium Phosphate | 0.38 | 0.38 |
| Meat and bone meal | 3.0 | 3.0 |
| Premix of vitamins & minerals | 0.6 | 0.6 |
| HMB | 0.0 | 0.05 |

At the end of the 5 week experiment chicks were decapitated and serum collected for pig red blood cells antibody titer determination. Titers to red blood cells were evaluated by a microtiter agglutination test (Kuhlman, et al.). Also, the Pectoralis major muscle (the major breast muscle) was dissected and weighed as a measure of muscle growth. The data is summarized in Tables G1 and G2.

TABLE G1

Growth and Feed Efficiency of Male Leghorns Fed KIC and HMB (5 week data)

| | Control | KIC | HMB |
|---|---|---|---|
| Gain (g) | 222 | 229 | 229 |
| Feed/gain | 2.30 | 2.24 | 2.17 |
| Breast muscle (%) | 2.84 | 2.94 | 3.00 |
| Red blood cell titer (dilution) | 1.57 | 2.65 | 3.25 |

TABLE G2

| | KIC Change from Control | HMB Change from Control |
|---|---|---|
| Gain (g) | 3.3% | 3.3% |
| Feed/gain | −2.5% | −5.8%** |
| Breast muscle (%) | 3.5% | 5.5%** |
| Red blood cell titer (dilution) | 68% | 107%** |

**Significant at the $p < .02$ level

The foregoing data shows that HMB increased performance of growing chicks by increasing the rate of growth and by making more efficient use of feed for growth. Additionally, it appears that muscle growth is stimulated relative to other tissues as evidenced by increased breast muscle size. Compared to KIC, HMB was superior in all parameters measured.

Feeding Periods

To obtain the advantages of the method and feed compositions of this invention for selectively increasing lean tissue formation while minimizing fat deposition in the raising of meat producing animals, it will be preferred to feed the animals the HMB on a daily basis while the animals are increasing in weight, and to continue the feeding for at least 10 days and up to 180 days, depending on the animals being fed. With beef cattle, for example, HMB is preferably fed for periods of at least 30 up to 180 days; with lambs, for periods of at least 15 up to 100 days; for chickens, for periods of at least 10 up to 50 days, and for turkeys, for periods of at least 10 up to 100 days. The periods referred to are when animals being raised are growing to market weight sizes. The maximum advantage of HMB administration should be obtained when fat being deposited and time deposition have decreased, which usually occurs in the later portion of feeding before marketing. Incorporation of HMB in finishing rations is therefore especially desirable.

I claim:

1. A feed composition for growing meat-producing beef cattle and lambs, consisting essentially of a protein-containing ruminant feed containing in admixture therewith from 0.01 to 0.1 weight percent of an edible salt of $\beta$-hydroxy-$\beta$-methylbutryic acid (HMB) on a Ca—HMB dry weight basis, wherein said feed composition increases lean tissue development in the meat production of said beef cattle and lambs.

2. A feed composition for growing meat-producing poultry, consisting essentially of a protein-containing poultry feed containing in admixture therewith from 0.01 to 0.1 weight percent of an edible salt of $\beta$-hydroxy-$\beta$-methylbutyric acid (HMB) on a Ca—HMB dry weight basis, wherein said feed composition increases lean tissue development in the meat production of said poultry.

* * * * *